United States Patent Office 3,558,393
Patented Jan. 26, 1971

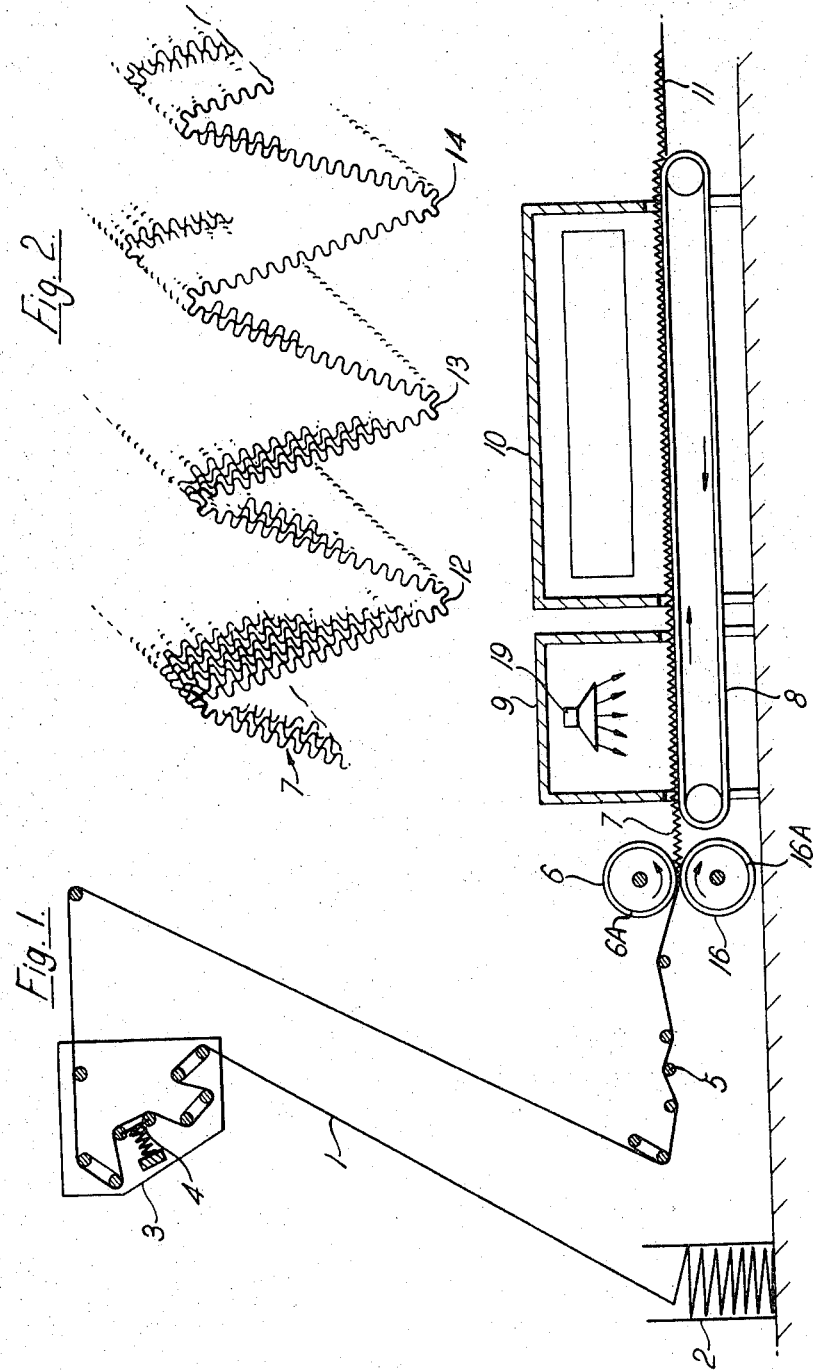

3,558,393
PROCESS FOR THE PREPARATION OF PADDING MATERIAL
Robert Bolliand and Claude Saligny, Lyon, France, assignors to Societe Rhodiaceta, Paris, France, a French body corporate
Filed Nov. 13, 1967, Ser. No. 682,097
Claims priority, application France, Nov. 15, 1966, 83,700
Int. Cl. D06m 15/70
U.S. Cl. 156—181                    5 Claims

ABSTRACT OF THE DISCLOSURE

The invention relates to padding material for upholstery and the like, and a method of manufacture thereof in which a large number of continuous, preferably crimped, chemical filaments are arranged side-by-side to form a flat sheet. The sheet is formed into deep undulations, e.g. by passing between rollers rotating at different peripheral speeds and the undulations are sprayed with a resin which is then hardened to fix the undulations in position.

---

The present invention relates to padding, stuffing or upholstering material and also relates to a process for the preparation thereof.

In the present description, the expression "padding material" is to be understood to mean a material which is more or less compressible, and little resilient, such as is utilised for the padding of furnishing articles such as pillows, cushions, eiderdowns, coverlets and counter-panes, sleeping bags, mattresses, upholstered furniture, and the like.

Natural materials, such as down, feathers or horse hair have conventionally been used for forming such padding material. However, these materials are relatively costly and are not available in qunatities sufficient to satisfy the constantly increasing demand. Furthermore, they have numerous practical disadvantages, in particular in relation to the cleaning thereof. Additionally, since these materials are often re-utilised after regeneration, the articles thus produced are open to the objection that they are insufficiently hygienic.

Attempts have also been made to use discontinuous, crimped, chemical fibres, for example synthetic fibres which are introduced, either alone or in a mixture, in flock or sheet form. Unfortunately, due to their structure, these fibres have the troublesome tendency that they pass through the cushion cover or other enveloping material and, in due course particularly after washing, agglomerate in the form of compact balls which it is impossible to dissociate. In order to reduce these disadvantages it has been proposed to bond synthetic fibres together by spraying with appropriate resins. However, although this solution does in fact prevent the fibres from piercing the enveloping material, on the other hand, it results in the production of articles having the same disadvantages as the cellular materials which have also been tried, i.e. articles which are relatively hard, so that they are not very suitable for such use and also do not oppose any great resistance to compression.

It is an object of the present invention to provide a novel padding material which obviates these disadvantages. According to the invention there is provided, as a novel industrial product, a padding material comprising a plurality of elementary continuous chemical filaments, arranged substantially parallel side-by-side in a sheet, a plurality of deep undulations being formed in the sheet transversely thereof, a bonding resin impregnating said sheet effective to fix the undulations therein. In a preferred embodiment, the filaments are crimped.

A method according to the invention, for the preparation of the said novel material includes passing under tension a row of continuous chemical filaments, in substantially parallel side-by-side relation, between two smooth rollers driven at different peripheral speeds to form deep undulations in the sheet, removing the thus formed undulations from downstream of the rollers, substantially without tension, spraying a bonding resin on the said undulating sheet and hardening the bonding substance deposited. Preferably, the bonding substance is a resin which is capable of being cured and which is hardened by thermal treatment. Advantageously, the ratio of the peripheral velocities of the rollers is 5 to 1 and in practice at least 7.5 to 1.

It will be recalled that the expression "tow" means an assembly, without twist or notably interlacing, of a large number of continuous filaments which may or may not be crimped. In textile usage, tows are merely intermediate elements which are subsequently converted to discontinuous fibres by cutting or breaking.

In the case of the present invention, contrary to current practice and forms of application, the starting tow is not cut. The said tow may be produced from any artificial or synthetic, chemical, textile material. Advantageously, tows consisting of continuous, synthetic, crimped filaments, are utilised, such as those based on polyamides, e.g. nylon, 6, 6.6, 6.10, 11; on polyolefines, e.g. polypropylene; on vinyl or vinylidene polymers and copolymers. Good results have been obtained with polyester filaments, e.g. ethylene polyterephthalate or acrylic filaments. In practice, the tow has been crimped by passage through a stuffing box. Similarly, tows consisting of low-stretch filaments are preferably utilised.

The invention will become more fully understood from the following detailed description, given merely by way of example, with reference to the accompanying drawings, in which:

FIG. 1 illustrates a schematic side elevation of a practical embodiment of the apparatus for preparing the novel material according to the teachings of the invention; and FIG. 2 is a schematic perspective view of the padding material so formed.

Referring to FIG. 1, a crimped tow 1, consisting of a plurality of continuous chemical filaments, is taken from a conventional storage carton 2 and is converted progressively to a sheet of substantially parallel filaments, in side-by-side relation, by means of a spreading or tentering mechanism having curved bars 3 and tensioning means 4.

The tow is then passed through a series of bars 5 and is fed under tension between two smooth rollers 6, 16 driven at different peripheral velocities. Thus roller 6 preferably has a peripheral velocity of 5 to 15 times that of roller 16. The two rollers are provided with a covering 6A, 16A of a resilient material having a high coefficient of friction, such as rubber; the spacing between the two rollers is regulated in such manner as just to permit the passage of the sheet and to impart thereto the desired tension downstream of the braking device. In general, the tension applied to the sheet, at the entry to the rollers, should be sufficient to lay the filaments parallel and to slightly eliminate the crimping.

At the roller outlet, the sheet is recovered in a substantially tension-free state. Due to the differences in tension applied to the tow upstream and downstream of the rollers, and to the differences in the driving velocity of the rollers, the tow has been converted to an undulating sheet or lap 7 as more fully illustrated in FIG. 2. The said sheet is then received on an endless conveyor belt 8, the advance velocity of which is regulated as a function of the velocity at which the tow leaves the rollers, in such manner as not to damage the undulations which have been formed. The undulating sheet is continuously introduced into a spraying chamber 9 wherein an appropriate quantity of a resin is applied by means of a spray nozzle 19. The material then passes through a heating oven 10, and the resin is hardened. The proportion of resin in the sheet is small. In practice, proportions, by weight, which are higher than 10% unnecessarily increase the cost price of the article and result in the production of articles which would be considered to be too hard.

Finally, according to the final application which is envisaged, the undulated and fixed sheet is received on a table 11, or, if appropriate, it may be cut to predetermined lengths and packaged. It is important that no tension capable of deforming the undulations should be applied to the sheet between the outlet from the rollers and the final receiving station.

Although, generally, a single undulated sheet is utilised, it would also be in certain applications, possible to superpose a multiplicity of such sheets, either immediately on leaving the rollers or after the curing of the resin; if required, the sheet or sheets may also be subjected to further treatment.

Similarly, before or after the application of the resin, it is possible to "stack" the sheet by folding the undulations formed parallel to themselves. In this way there is produced a material which is denser but is still extremely compressible and sufficiently resilient, and which may be suitable for the manufacture of a padding, stuffing or upholstery material such as is normally utilised for the manufacture of furnishings, and mattresses.

The following examples, which are given purely by way of illustration without limitation of the scope of the invention, show the manner in which the invention may be carried into effect and the advantages resulting therefrom.

EXAMPLE 1

The apparatus shown in FIG. 1 was fed with a tow, the total count of which was 200,000 deniers and which was constituted by filaments of ethylene polyterephthalate having a unit count of 1.5 denier, and a crimp of 3 to 4 undulations per centimetre. After passage through the tentering or spreading arrangements 3, the tensioning means 4 and the bars 5, the sheet or lap formed has an average width of 200 mm.

The said sheet was passed, under a tension of substantially 1.5 kg., between the two smooth, rubber-covered rollers, the diameter of which was 205 mm., the thickness of the covering 5 mm. and the hardness 60° Shore, and the spacing of which was $2/10$ of a millimetre. The upper roller 6 rotated at a peripheral velocity of 18 m./min., and the lower roller 16 at 1.96 m./min.

The undulating sheet formed was received, without tension, on the conveyor belt 8 at a velocity of 4 m./min. The said sheet weighed 130 gm./m.$^2$, its width was approximately 400 mm., for a thickness, measured at the apices of the undulations, of 45 mm., and it has an average of undulations 12, 13, 14 per 10 cm.

On the said undulating sheet, there was continuously sprayed, at a rate of 10 gm./m.$^2$ dry product, a non-plasticised curable acrylic resin and which contained 40% dry extract, in dispersion in water containing an anionic surface-active agent. By drying for 4 minutes at 150° C., the deposited resin was cured.

The undulated and fixed sheet was received on a mandrel to which alternating lateral, rotary movement was imparted. 600 gm. of the said sheet is taken up, in wound form, so as to form a 60 x 55 x 16 cm. sheet which was introduced into an envelope in such manner as to manufacture a pillow. In use, it was found that the said pillow was readily compressed and was resilient, that the elementary filaments did not pass through the envelopes and above all that, even after ten household washing operations, including washing in a washing machine with soapy water at 45° C., there was substantially no deterioration of the elementary sheets and that the filaments thereof did not tend to agglomerate in the form of balls. These pillows could be employed with success in places where frequent washing is necessary, notably in hospitals and hotel establishments.

EXAMPLE 2

A crimped 90,000 denier tow, comprising 30,000 elementary acrylic filaments, is prepared in the same manner as in the example of the first addition No. 84,282 to French Pat. No. 1,375,042.

Four of these tows were juxtaposed and then, using the same device as in Example 1, an undulating sheet weighing 150 gm./m.$^2$ and having a thickness, measured across the apices of the undulations, of 45 mm. and a width of 400 mm., was prepared.

As previously, a pillow was manufactured. During use, the said pillow exhibited the same advantages as did that of Example 1.

We claim:
1. A method of preparing a padding material, such method including the steps of:
    (i) providing a pair of smooth rollers;
    (ii) rotating said rollers at different peripheral speeds;
    (iii) feeding to said rollers under tension a plurality of continuous chemical filaments in substantially parallel side-by-side relation as an elongate sheet to said rollers effective to form deep undulations in said sheet;
    (iv) removing the thus formed undulating sheet from downstream of said rollers substantially without tension;
    (v) spraying a bonding resin on the undulating sheet; and
    (vi) hardening the bonding resin applied.
2. A method as defined in claim 1 including the additional step of crimping the continuous chemical filaments prior to feeding to said rollers.
3. A method as defined in claim 1 including the additional step of providing said rollers with a covering of rubber.
4. A method as defined in claim 1 wherein the hardening of the bonding resin is effected by thermal treatment.
5. A method as defined in claim 1, wherein the rollers are rotated at peripheral velocities having a ratio of at least 5 to 1.

References Cited
UNITED STATES PATENTS

| | | | |
|---|---|---|---|
| 3,309,185 | 3/1967 | Weber | 156—181X |
| 3,368,934 | 2/1968 | Vosburgh | 156—181X |
| 3,499,810 | 3/1970 | Wagle | 156—181X |

BENJAMIN R. PADGETT, Primary Examiner

U.S. Cl. X.R.

156—180, 205, 206, 210, 219